Jan. 9, 1962
T. A. REUTZ
3,015,841
HOLDER FOR FILLETING FISH
Filed Feb. 16, 1959
2 Sheets-Sheet 2
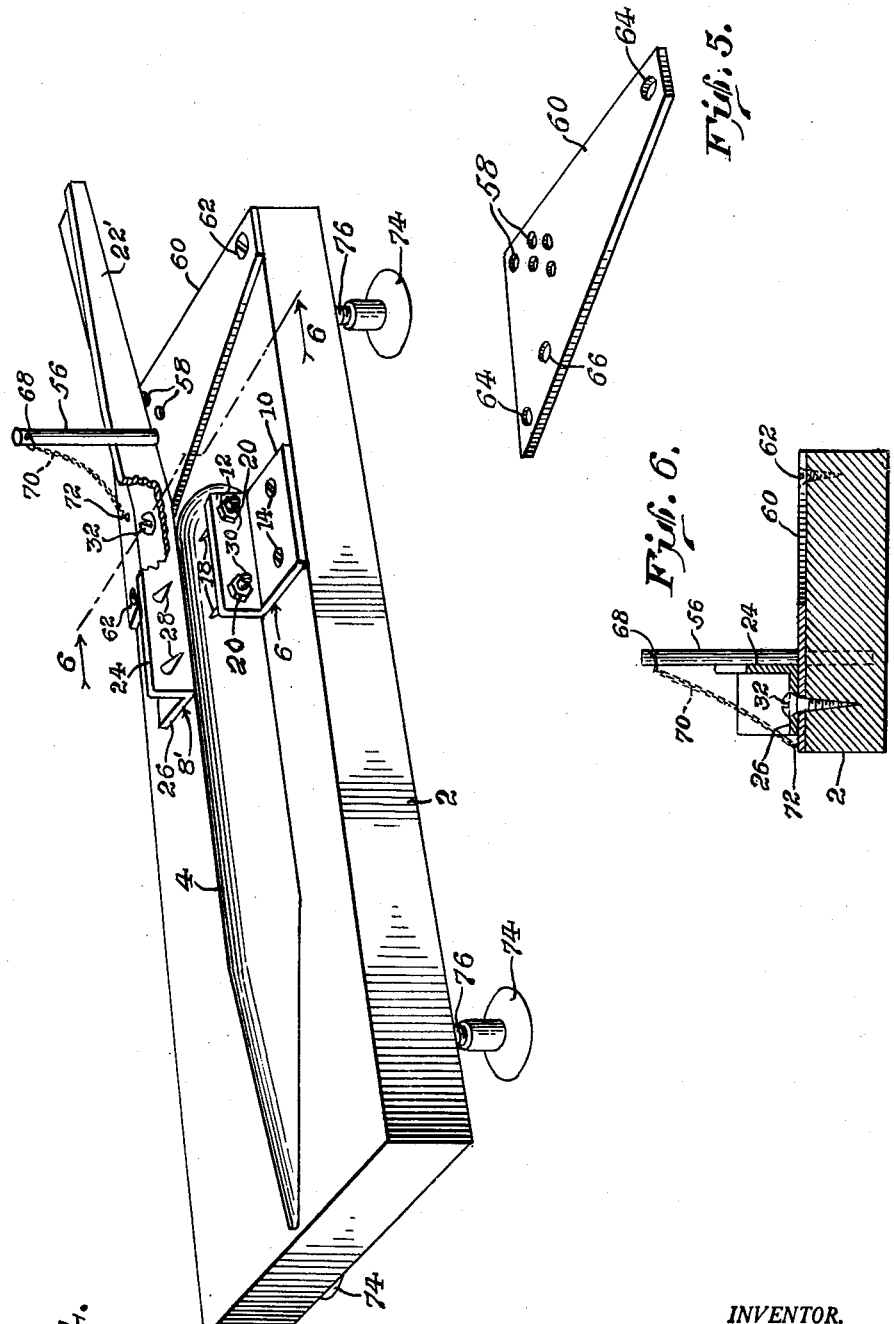
INVENTOR.
T. Anderson Reutz.
BY
Cushman, Darby & Cushman
Attorneys.

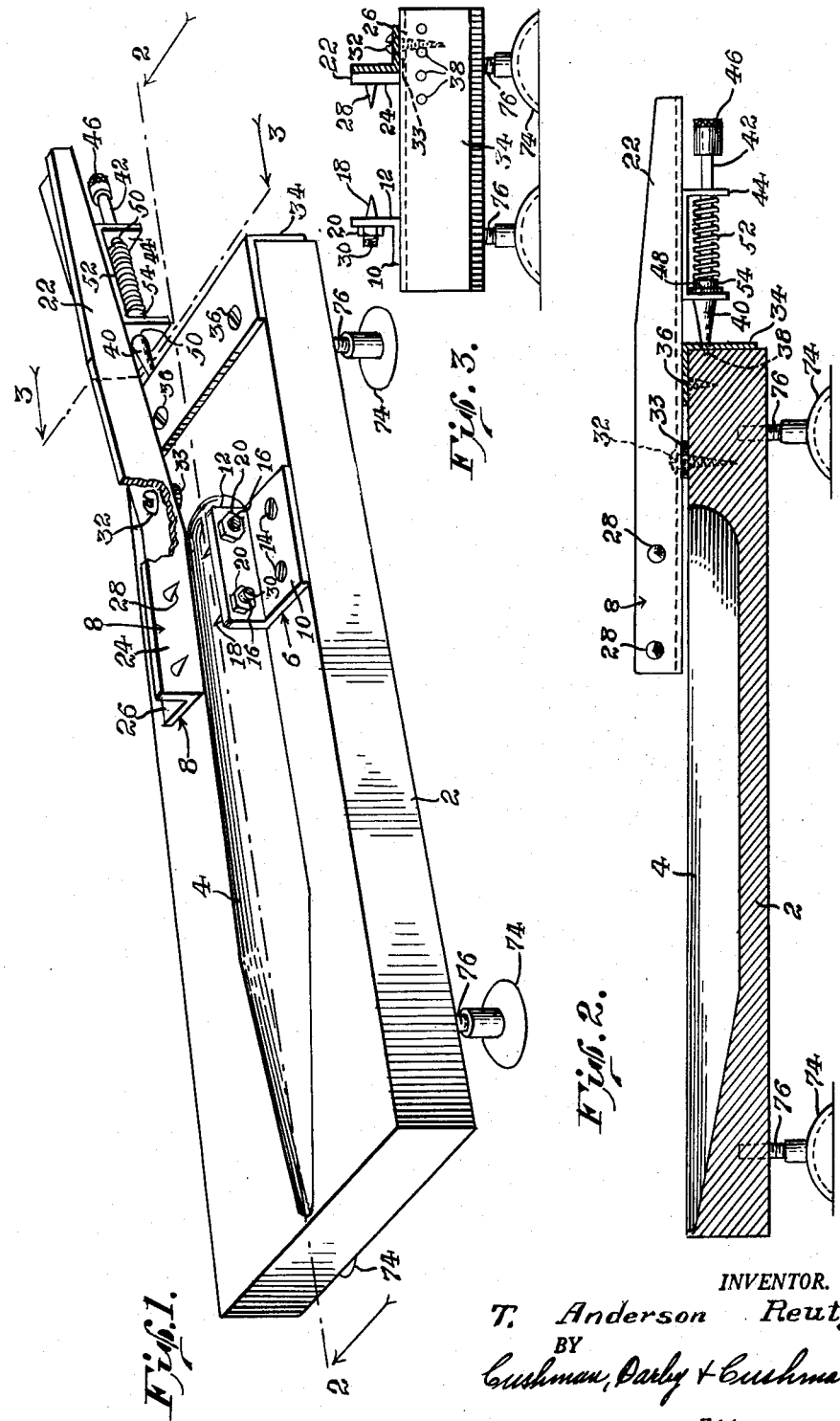

United States Patent Office 3,015,841
Patented Jan. 9, 1962

3,015,841
HOLDER FOR FILLETING FISH
Theodore Anderson Reutz, 1904 S. Van Buren St.,
Little Rock, Ark.
Filed Feb. 16, 1959, Ser. No. 793,342
1 Claim. (Cl. 17—8)

This invention relates to a fish holder, and more particularly to a holder having a clamping device for holding a fish while the fillet or steaks are being cut from the body.

The principal object of this invention is to provide a clamping device which engages the head of the fish so that the clamping means will not be in the way of the knife being used by the operator as the steaks are being cut from the body.

Another object of the invention is to provide a fish holder or clamping means in which one jaw has a considerable range of adjustment thus adapting the holder to fish of many different sizes.

Still another object of this invention is to provide a holder which has means on its underside to prevent its slipping on the surface on which it is mounted, and a separate means on its upper surface to prevent the tail and central portions of the fish from moving sidewise as the cutting operation is taking place.

A still further object of this invention is to provide a fish holder which is inexpensive to manufacture and easily transportable.

Other objects will appear hereinafter throughout the specification.

Referring now to the drawing:

FIGURE 1 is a perspective view of one form of my invention;

FIGURE 2 is a vertical sectional view taken on the line 2—2 of FIGURE 1;

FIGURE 3 is a vertical sectional view taken on the line 3—3 of FIGURE 1 showing the operating handle for the movable jaw of the clamp in section and one end of the body portion of my holder in elevation;

FIGURE 4 is a perspective view of another form of my invention in which a different means for holding the operating handle and in turn the clamping jaw in its various positions is used;

FIGURE 5 is a perspective view of the locking plate on which the operating handle for the movable clamping jaw is mounted; and FIGURE 6 is a vertical section taken on the line 6—6 of FIGURE 4.

In the drawing, 2 represents a substantially flat rectangular body member on which the clamping means of my invention is mounted. As indicated in FIGURES 1, 2 and 4, the body 2 is provided with a groove 4 in its upper side shaped to receive the lower portion of the body of a fish, and as shown in these figures, the groove 4 tapers outwardly and upwardly at the end of the body member remote from the clamping means to more nearly conform to the tail portion of the fish. The clamping means comprises a fixed jaw 6 and a movable jaw 8, the former of which is rigidly mounted on the body member 2 adjacent the inner end of the groove 4, and the latter of which is mounted on the opposite side of the groove 4 from the fixed jaw 6. The jaw 6 comprises an angle bar having its legs 10 and 12 arranged at a right angle to each other, the leg 10 being rigidly secured to the upper face of the body member 2 by screws 14, and the leg 12 being located adjacent one side of the groove 4 and extending upwardly from the upper face of the body 2 at a right angle thereto. As indicated in FIGURES 1 and 4, the leg 12 of the angle bar carries a pair of horizontally spaced bolts 16 threaded on their outer ends and having their inner ends pointed to form barbs 18 for engaging one side of the head of a fish. The bolts 16 are threaded into openings in the leg 12 so that they can be adjusted, if desired, and are locked in their adjusted positions by the lock nuts 20. The movable jaw 8 is pivotally mounted on the upper face of the body 2 on the opposite side of the groove 4 from the fixed jaw and is extended beyond the adjacent end of the body 2 to form a handle portion 22 which may be grasped by an operator and swung in one direction to engage the movable jaw with a fish or in the opposite direction to free the fish from the clamping means. The movable jaw 8, like the stationary jaw 6, is formed as an angle bar having a vertically disposed leg 24 and a horizontally arranged leg 26, as clearly shown in FIGURES 1, 4 and 6. The leg 24 like the leg 12 of the fixed jaw carries a pair of barb members 28 threaded or otherwise suitably secured to mate with the barbs 18 on the fixed jaw. As shown in FIGURE 3, the outer ends of the barb members may be provided with kerfs 30 to receive a screw driver or other driving tool. The movable jaw 8 is pivoted to the body 2 by the screw 32 and is spaced from the top face of the body by a washer 33 which has a thickness substantially equal to the thickness of the plate 34 which is secured to the adjacent end of the body 2 by the screws 36. This plate 34 is of angle form and has one of its flanges engaged with the adjacent end edge of the body 2 and its other flange engaging the top face of the body member. As shown in FIGURE 3, the flange on the end edge of the body member is provided with a series of apertures 38 any one of which may receive the inner pointed end 40 of the locking pin 42 carried on the underside of the handle portion 22 by the U-shaped member 44 to latch the movable jaw in the desired position. As best shown in FIGURE 2, the pin 42 is provided with a handle portion 46 at its outer end and an annular flange 48 adjacent its inner pointed end 40 to limit inward movement of the pin through the aligned openings 50 in the member 44 under the action of the spring 52 which surrounds the pin 42 and is confined between the outer flange of the member 44 and a shoulder 54 formed on the pin adjacent the flange 48. In operation, the pin may be pulled outwardly against the action of the spring after which the handle member 22 may be swung in a clockwise direction to move the movable jaw 8 in a direction away from the fixed jaw to release a clamped fish or to allow one to be placed in position to be clamped. After the fish is in position with its head between the jaws and its lower portion in the groove 4, the handle member 22 may be moved in the opposite direction to bring the barbs 28 into a position to pierce the head of the fish and in turn bring the opposite side of the head into a position to be pierced by the barbs 18 on the fixed jaw. When in this position with the head tightly clamped between the fixed and movable jaws, the locking pin may be released and under the action of the spring engaged in one of the apertures 38 to hold the fish in a position in which all but the head portion may be readily cut to obtain the meaty parts desired.

Referring now to the second form of the invention shown in FIGURES 4, 5 and 6, the general arrangement of the parts is the same as the form of FIGURES 1, 2 and 3 except that a different locking means is used. In the second form, the spring actuated latch is omitted and the handle portion 22' and in turn the movable jaw 8' are held in their different positions by a manually operated pin 56 which may be inserted in any one of the apertures 58 in the plate 60 secured to body member 2 by the screws 62 which extend through holes 64 in the plate 60. It will be noted that the plate 60 underlies the movable jaw member and is provided with an aperture 66 to receive the pivot screw 32. If desired, the pin 56 may be provided with a diametrical opening 68 at one end to receive one end of a chain or other flexible element 70 to prevent loss of the pin 56 from the base member. The other end of the chain 70 may be secured to the base member as at 72.

As clearly shown in FIGURES 1, 2, 3 and 4, the body member 2 may be provided with suction cups 74 on its underside to aid in keeping the holder in place on its support. These cups are adjustably mounted on threaded bolts 76 so that one end of the body member 2 may be elevated with respect to the other, if desired. As indicated, two pairs of cups 74 are used, one pair at each end of the body member.

The above description and drawings disclose two embodiments of the invention, and specific language has been employed in describing the figures. It will, nevertheless, be understood that no limitations of the scope of the invention are thereby contemplated, and that various alterations and modifications may be made as would occur to one skilled in the art to which the invention relates.

I claim:

A fish holder comprising an elongated base member, said base member being provided with a longitudinally extending groove in its upper side, a pair of clamping jaws mounted on the upper side of said base member, said jaws being disposed in spaced relation on opposite sides of said groove, one of jaws being fixed to and the other pivoted on said base member, said pivoted jaw having one end extended beyond one end of said base member to provide a handle for moving said pivoted jaw toward and away from said fixed jaw, a plurality of barb means on each jaw for piercing a portion of a fish clamped between said jaws, a locking plate carried by said base member beneath said handle, said locking plate having a horizontally extending flange mounted on the upper side of said base member and a vertically extending flange engaging said one end of said base member, said vertically extending flange being provided with a series of spaced perforations, a pair of spaced flange members extending downwardly from said handle and being provided with aligned apertures, a locking pin slidably mounted in said apertures, said pin being adapted to engage selected ones of said series of spaced perforations, a spring means between said pair of spaced flange members for urging said locking pin toward its locking position in one of said spaced perforations, and adjustable suction cup means on the lower side of said base member for releasably securing said holder on a supporting surface and for vertically adjusting one edge of said base member with respect to another.

References Cited in the file of this patent

UNITED STATES PATENTS

| 1,156,510 | Welz | Oct. 12, 1915 |
| 1,353,981 | Bahde | Sept. 28, 1920 |
| 2,531,546 | Anderson | Nov. 28, 1950 |
| 2,553,700 | Brooker | May 22, 1951 |
| 2,795,814 | Gaultney | June 18, 1957 |

FOREIGN PATENTS

| 47,376 | France | Dec. 29, 1936 |